United States Patent [19]
Ito et al.

[11] Patent Number: 5,735,240
[45] Date of Patent: Apr. 7, 1998

[54] DIRECT INJECTED ENGINE

[75] Inventors: Takeshi Ito; Naoki Tsuchida; Masahisa Kuranishi, all of Iwata, Japan

[73] Assignee: Yamaha Hatsudoki Kabushiki Kaisha, Iwata, Japan

[21] Appl. No.: 666,747

[22] Filed: Jun. 19, 1996

[30] Foreign Application Priority Data

Jun. 19, 1995 [JP] Japan ................. 7-175383

[51] Int. Cl.$^6$ ..................................... F02B 17/00
[52] U.S. Cl. ............... 123/295; 123/298; 123/302; 123/305
[58] Field of Search ................. 123/294, 295, 123/298, 301, 302, 305

[56] References Cited

U.S. PATENT DOCUMENTS

| | | | |
|---|---|---|---|
| 1,863,232 | 6/1932 | Woolson | 123/294 X |
| 1,967,243 | 7/1934 | Hesselman | 123/305 |
| 2,058,487 | 10/1936 | Mock | 123/298 |
| 2,483,288 | 9/1949 | Malin | 123/298 |
| 2,800,118 | 7/1957 | Scherenberg | 123/298 |
| 3,154,059 | 10/1964 | Witzky et al. | 123/302 X |
| 3,318,292 | 5/1967 | Hideg | 123/302 X |
| 4,318,377 | 3/1982 | Occella et al. | 123/298 X |

FOREIGN PATENT DOCUMENTS

| | | | |
|---|---|---|---|
| 870232 | 3/1942 | France | 123/302 |
| 505332 | 5/1939 | United Kingdom | 123/299 |

*Primary Examiner*—Tony M. Argenbright
*Attorney, Agent, or Firm*—Knobbe, Martens, Olson & Bear LLP

[57] ABSTRACT

A direct fuel-injected, multivalve, twin overhead cam shaft internal combustion engine. The fuel injector is mounted in the cylinder bore on either the intake or the exhaust side and sprays generally transversely across the diameter of the cylinder bore so as to provide stratification under at least low-speed and low-load conditions. The injector is disposed so that it is positioned below the top of the head of the piston at its top dead center position and a recess is formed in the piston head so as to clear the fuel spray and permit injection even when the piston approaches top dead center without obstruction from the piston. This recess also clears one of the valves.

20 Claims, 6 Drawing Sheets

DIRECT INJECTED ENGINE

BACKGROUND OF THE INVENTION

This invention relates to an internal combustion engine and more particularly to a direct cylinder fuel injection system for such engines.

In the interest of improving fuel economy, exhaust emission control and maximum engine output, it has been proposed to employ fuel injection systems rather than more conventional carburetors. For automotive application, the fuel injectors normally utilized are of the so-called "manifold" type. That is, the fuel injector sprays fuel into the intake manifold of the engine. The injected air is there mixed with the fuel and delivered to the combustion chamber through its conventional induction system, hence the name manifold injection.

Although manifold injection systems have considerable advantages in fuel control over carburetors, they do have some disadvantages. One of the advantages of fuel injection is the possibility and the improved ability to maintain a stratified charge in the combustion chamber. If fuel stratification is possible, it is then feasible to operate the engine with a less than total stoichiometric mixture in the combustion chamber.

If stratification is not accomplished, then the mixture in the entire combustion chamber must be homogenous so as to ensure ignition. If, however, stratification can be achieved then a stoichiometric mixture need be present only at the gap of the spark plug at the time of firing. Thus, considerable economy and emission control advantages can be obtained if stratification can be achieved. However, with manifold injection systems it is very difficult to stratify the charge in the combustion chamber to any significant extent. Therefore, direct cylinder injection offers a viable alternative in spite of its higher cost.

However, there is another reason why direct cylinder injection is not utilized in addition to its somewhat higher cost. This is the difficulty and complexity of positioning the fuel injector in the cylinder head. Fuel injectors are frequently employed in conjunction with higher performance engines. These engines as well as more conventional engines are now leaning toward the use of more than two valves per cylinder (one intake and one exhaust valve) and also toward the use of one or more overhead cam shafts for operating the valves. When the engine is provided with multiple valves, overhead cam shafts and one or more spark plugs, there is little space left remaining for the positioning of the fuel injector in the engine.

It is, therefore, a principal object of this invention to provide an improved fuel injected internal combustion engine.

It is another object of the invention to provide an improved direct cylinder injected engine that permits utilization with multivalve and overhead cam shaft engines.

There have been proposals to employ fuel injectors in two cycle engines wherein the injector is mounted in the cylinder block. However, with a two-cycle engine this is normally done so as to position the injector spray in proximity to the scavenging air flow so as to improve scavenging and fuel distribution. However, this concept has not been utilized with four-cycle engines because of the lack of scavenging ports and the lack of necessity for positioning the injector directly in the path of scavenging air flow. However, if utilized with a four-cycle engine, the fuel injector should be provided in a location wherein the desired mixture stratification and mixture distribution can be obtained.

It is, therefore, a still further object of this invention to provide an improved four-cycle engine direct fuel injection system.

It is yet another principal object of the invention to provide a four-cycle engine direct cylinder injection system wherein the fuel injector is mounted in the cylinder block and sprays in an appropriate direction into the cylinder bore to achieve the desired mixture distribution.

SUMMARY OF THE INVENTION

This invention is adapted to be embodied in a direct injected, internal combustion engine having a cylinder block defining at least one cylinder bore. A cylinder head closes one end of the cylinder bore. A piston reciprocates in the cylinder bore and forms with the cylinder bore and cylinder head a variable volume combustion chamber. A plurality of valve seats are formed in the cylinder head for providing an intake flow path for induction of an air charge into the cylinder bore and an exhaust flow path for discharge of burnt combustion product from the combustion chamber. A plurality of poppet valves are supported in the cylinder head for reciprocation and have head portions for cooperation with the valve seats for controlling the flow therethrough. At least one fuel injector is mounted in the cylinder block for spraying fuel into the combustion chamber through the cylinder bore.

DETAILED DESCRIPTION OF THE PREFERRED EMBODIMENTS OF THE INVENTION

Figure 1:
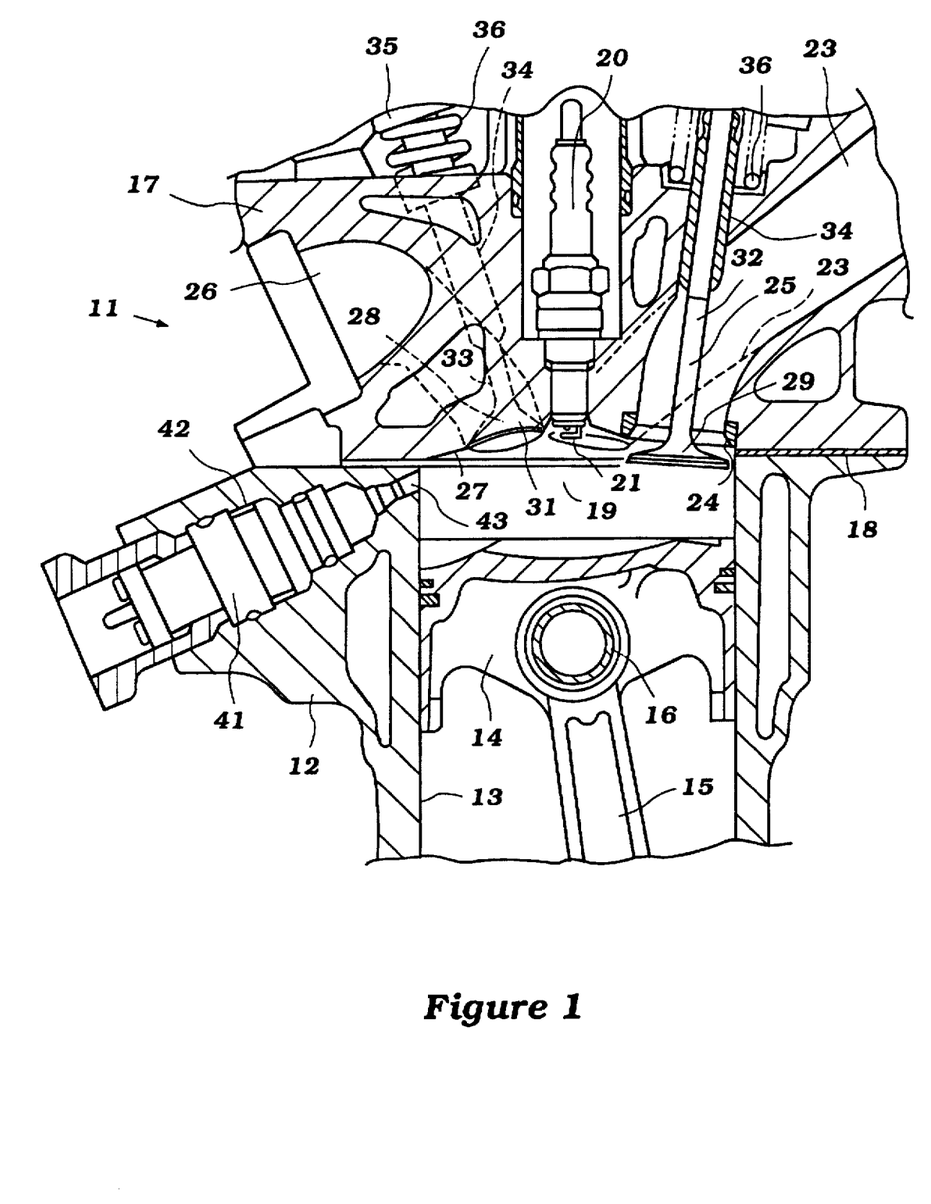
FIG. 1 is a cross-sectional view of a portion of an internal combustion engine constructed in accordance with an embodiment of the invention.
Figure 2:
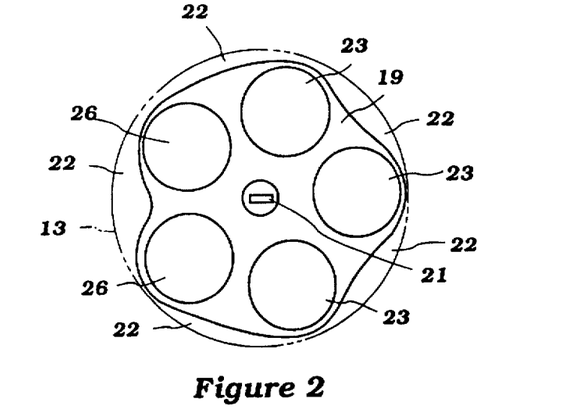
FIG. 2 is a bottom plan view of the portion of the cylinder head that is bounded by the cylinder bore, which is shown in phantom.
Figure 3:
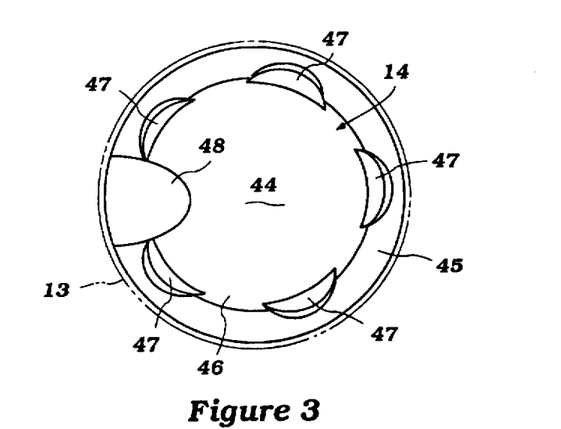
FIG. 3 is a top plan view of a piston constructed in accordance with this embodiment of the invention.

Referring now to the drawings and initially to FIGS. 1–3, the uppermost portion of a four-stroke internal combustion engine constructed in accordance with an embodiment of the invention is indicated by the reference numeral 11. The engine 11 may be of any type configuration, such as an in-line type or a V-type engine, and may have any number of cylinders.

The engine 11 is provided with an engine body, such as a cylinder block 12, to which is affixed at its lower end by any suitable means a crankcase member (not shown) which contains the crankshaft (not shown) for the engine 11. One or more cylinder bores 13 is formed within the cylinder block 12 in which a piston 14 reciprocates. The construction of the piston 14 will be discussed in detail later. The piston 14 is pivotally connected to the small end of a connecting rod 15 by means of a piston pin 16. The big end of the connecting rod 15 is journaled about a throw of the crankshaft. As already noted, the crankshaft is rotatably journaled within the crankcase member.

A cylinder head assembly is indicated by the reference numeral 17 and affixed to the upper surface of the cylinder block 12 in any well-known manner. A gasket 18 is interposed between the lower surface of the cylinder head 17 and the upper surface of the cylinder block 12 so as to affect the seal between the cylinder head 17 and block 12.

A recess 19 is formed in the lower surface of the cylinder head above which is positioned a spark plug 20 with its gap 21 extending into the recess 19. The spark plug 20 is fired by an ignition system (not shown) that is controlled by an electronic control unit or ECU (not shown).

The recess 19 is aligned with the cylinder bore 13 and the head of the piston 14 to form a combustion chamber for the engine 11. The recess 19 can be referred to as the combustion chamber, since at top dead center (TDC) its volume comprises the major portion of the clearance volume.

The recess 19 also includes lower flat surface portions that extend along the outer edges of the recess 19 and are henceforth referred to as squish areas and indicated by the reference numeral 22. The squish areas 22 cooperate with the piston 14 in a manner that will be described in detail later.

As seen in FIGS. 1 and 2, a trio of intake passages 23 extends through one side of the cylinder head 17. The intake passages 23 are served by an induction system (not shown) which supplies atmospheric air to the intake passages 23. The intake passages 23 define intake flow paths through which an air charge is delivered to the combustion chamber 19 and which terminate at their inner ends at a trio of intake valve seats 24 which are controlled by poppet-type intake valves 25.

The valve seats 24 are disposed in the combustion chamber 19 so that the center seat 24 is disposed on a plane that passes through the axis of the cylinder bore 13. This plane is the same as the plane of FIG. 1. The side valve seats 24 are disposed on opposite sides of this plane and are intersected by a second plane containing the cylinder bore axis and perpendicular to the first mentioned plane.

In a similar manner, a pair of exhaust passages 26 extend through the opposite side of the cylinder head 17 and define exhaust flow paths which open at their outer ends to an exhaust system (not shown) that is affixed to the cylinder head 17 by any suitable means. The inner ends of the exhaust passages 26 terminate at a pair of exhaust valve seats 27 which are controlled by poppet-type exhaust valves 28. The exhaust valve seats 27 lie on the other side of the elongated second plane from the center intake valve seat 24.

The intake and exhaust valves 25 and 28 include respective head portions 29 and 31 for controlling the valve seats 24 and 27 and stem portions 32 and 33 which are slidingly journaled within valve guides 34. The valve guides 34 are press-fitted within the cylinder head 17 above the intake and exhaust passages 23 and 26, respectively.

The intake and exhaust valves 25 and 28 are operated by bucket-type tappets 35, one of which is shown partially in FIG. 1 for an exhaust valve 28 only. The tappets 35 comprise a portion of a valve train assembly which includes the valve springs 36 for closing the valves 25 and 28. The valves 25 and 28 are opened by the lobes of respective overhead camshafts (not shown) through the tappets 35. The overhead camshafts are journaled for rotation in the cylinder head 17 in a known manner and are driven at one-half engine speed from the crankshaft by any known type of drive.

It is highly desirable to maintain a stratified charge within the combustion chamber 19 under conditions less than full speed and power, since such a charge effectively reduces the exhaust gas emissions of the engine 11 while improving its efficiency and power output. As is commonly known in the art, fuel injection offers superior charge stratification than does carburation. It is therefore desirable to employ fuel injectors as the means by which the fuel is introduced to the intake air charge in the combustion chamber 19. A problem exists, however, in the positioning of the fuel injector, since the area above the combustion chamber 19 is occupied by the spark plug 20 and valve train assembly. This problem is especially acute in engines that utilize multiple overhead intake and exhaust valves, as is the case for the engine 11 described above.

One solution to the above problem is to position the fuel injectors such that they spray their fuel into the induction system of the engine, or more specifically into the intake manifold. Unfortunately, such manifold-type fuel injection only offers limited charge stratification capability, whereas an engine in which the fuel is sprayed directly into the combustion chambers, referred to as a direct injected engine, offers superior charge stratification. It is therefore desirable to utilize direct fuel injection. This invention allows for the use of direct fuel injection by disposing the fuel injectors in proximity to the combustion chambers, but at a distance from the overhead valve train, thus allowing the advantages of direct fuel injection to be exploited while negating the packaging constraints normally associated with direct fuel injection.

Figure 4:
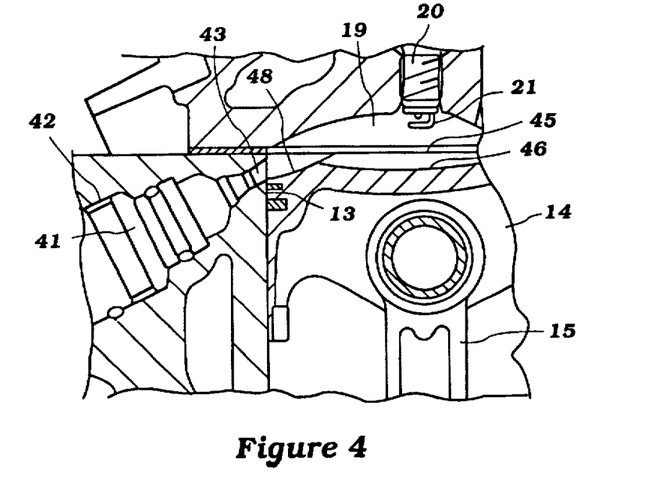
FIG. 4 is an enlarged cross-sectional view of a portion of the internal combustion engine in part similar to FIG. 1, but with the piston shown at top dead center.

With reference now to FIGS. 1, 3, and 4, a fuel injector is indicated by the reference numeral 41 and positioned within a fuel injector chamber 42 that is integrally formed in the uppermost portion of the cylinder block 12 immediately below and in between the exhaust valve seats 27. The chamber 42 includes a nozzle portion 43 which opens to the combustion chamber 19. As seen in FIGS. 1 and 4, the fuel injector 41 is disposed within the chamber 42 at some acute angle from horizontal and sprays the fuel through the nozzle 43 transversely across the combustion chamber 19 in an upward direction and generally towards the spark plug gap 21 and the center intake valve and valve seat 25 and 23. The fuel injector 41 is supplied with fuel from a fuel tank (not shown) and delivers the fuel to the combustion chamber 19 under the control of the electronic control unit or ECU.

The construction of the piston 14 will now be discussed in detail. FIG. 3 is a top plan view which shows the head 44 of the piston 14. As seen in this figure, the head 44 of the piston 14 includes an upper or crown portion 45 which extends circumferentially about the head 44. The crown portion 45 of the piston head 44 cooperates with the squish areas 22 of the recess 19. When the piston 14 is at top dead center (TDC) the clearance between the crown 45 and squish areas 22 is minimal and any intake air charge compressed between the two surfaces is forcefully ejected towards the center of the combustion chamber 19. This generates what is known as squish flow that creates turbulence which, in turn, aids combustion as is commonly known in the art.

A concave bowl portion 46 of the piston 14 comprises the center of the head 44 and defines the shape of the lowermost portion of the combustion chamber 19. The combustion chamber 19 has what is generally referred to as a lens shape.

A plurality of clearance recesses 47 are formed atop the head 44 of the piston 14 in a spaced relationship along the junction between the piston crown 45 and concave portion 46. As is commonly known in the art, these recesses cooperate with the intake and exhaust valves 25 and 28, respectively, in high-compression engines and provide clearance for the valves which when the piston 14 is at or near top dead center (TDC). Thus, the recesses 47 allow the piston 14 a greater upward stroke for higher compression, while avoiding any clearance problems with the intake and exhaust valves 25 and 28.

As can be seen in FIG. 4, the crown 45 of the piston 14 is above the fuel injector inlet nozzle 43 when the piston 14 is at or near top dead center (TDC). This is also the time at which the fuel injector 41 is spraying fuel into the combustion chamber 19 under at least some running conditions. This means that the side of the piston 14 blocks the nozzle 43, and thus prevents some, if not all, of the injected fuel from entering the combustion chamber 19.

A further recess, henceforth referred to as the injection recess and indicated by the reference numeral 48, is therefore formed in the head 44 of the piston 14 in order to allow the fuel to enter into the combustion chamber 19 when the piston 14 is at or near top dead center (TDC). The injector recess 48 is disposed between the recesses 47 that cooperate with the exhaust valves 28 and is of sufficient depth to ensure that the fuel injector spray nozzle 43 is open to the combustion chamber 19, even when the piston 14 is at top dead center (TDC). Thus, direct injection for the engine 11 is accomplished, and a stratified charge is present in the combustion chamber 19.

Figure 5:
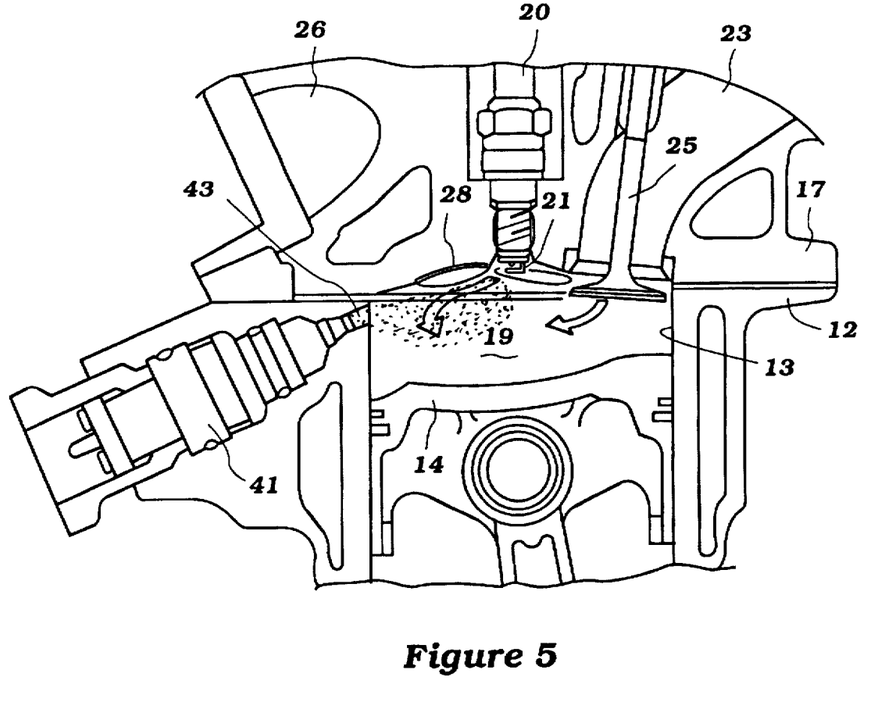
FIG. 5 is a cross-sectional view of this embodiment and that illustrates a portion of the induction cycle for the engine.
Figure 6:
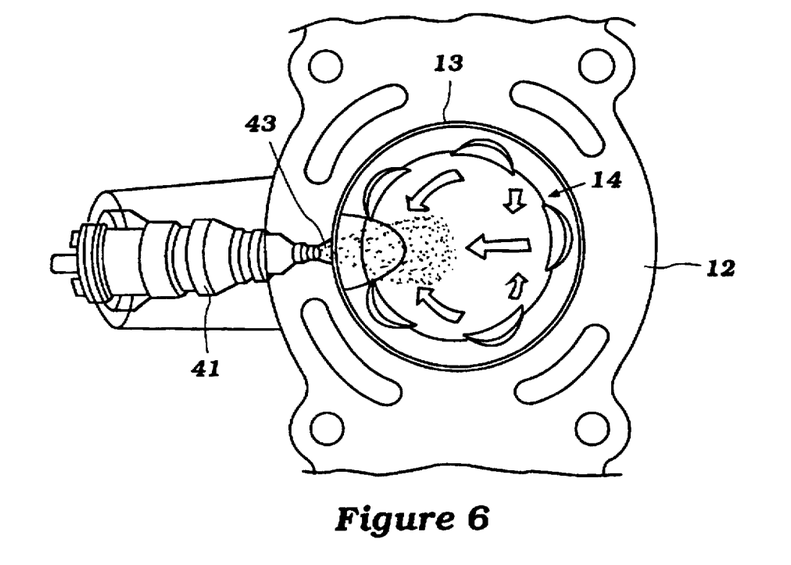
FIG. 6 is a top plan view of the engine in the condition of FIG. 5, with the cylinder head removed.

FIGS. 5 and 6 illustrate an injection pulse of the engine 11 and shows how the charge is stratified within the combustion chamber 19. The shaded portion indicates injected fuel, while the arrows indicate the air flow through the intake passages 23 into the combustion chamber 19 with the smaller arrows indicating squish flow generated the cooperation between the piston crown 45 and the squish areas 22. As can be seen, the fuel is injected towards the spark plug gap 21 where it collides head-on with air from the center intake passage 23. This produces a homogenous, stoiciometric, air-fuel mixture in the vicinity of the gap 21, which is necessary for combustion to occur. The remaining charge in the combustion chamber 19 is stratified, since the air flow from the squish areas 22 and remaining two intake passages 23 at this time is directed in front of and around the fuel spray and has not yet mixed with the fuel.

After the spark plug 20 is fired, the homogenous mixture at the gap 21 ignites, burns and expands and forces unburnt fuel outwardly where it readily mixes with the air charge which subsequently also ignites, burns and expands. It should be noted that ignition occurs within the combustion chamber 19 even at locations where the air fuel mixture is leaner than desired for optimum combustion since the pressure generated by the ignition of the homogenous, stoiciometric mixture at the gap 21 is sufficiently high to induce the combustion of such lean mixture areas. Also, as is seen in the figures, the presence of the injector recess 48 on the piston crown 45 precludes the generation of squish flow in the area above the fuel injector nozzle 43 since the clearance between the recess 48 and the crown 45 is not sufficiently small for generating squish flow at this location. Thus, the fuel from the fuel injector 41 remains stratified as it is injected towards the gap 21 as is illustrated in FIGS. 5 and 6.

Figure 7:
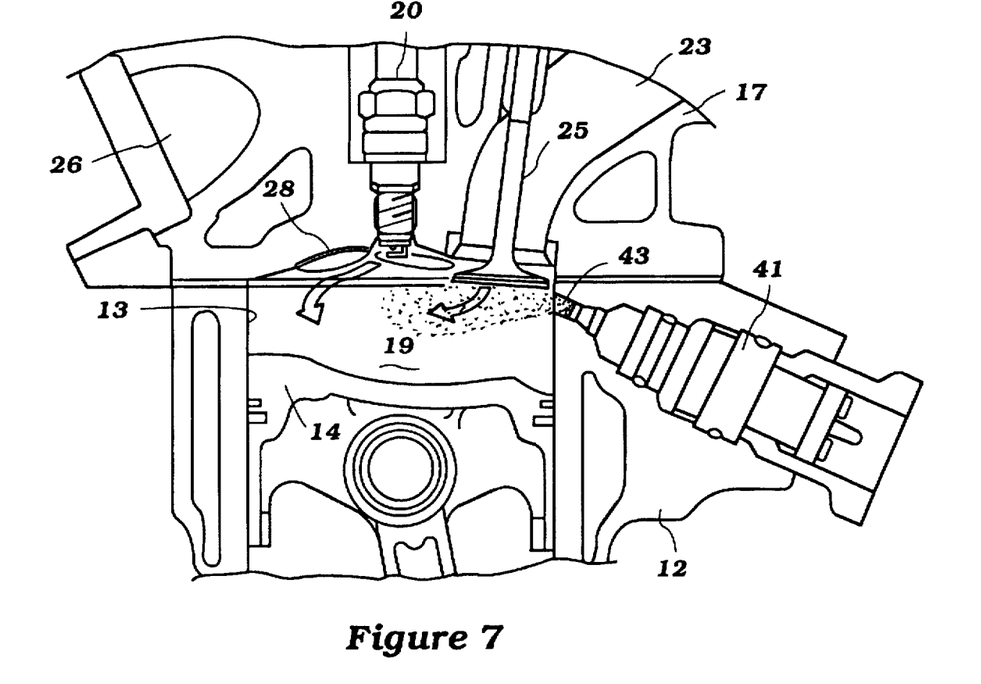
FIG. 7 is a cross-sectional view of a portion of an internal combustion engine similar to FIG. 5 and illustrates another embodiment of the invention.
Figure 8:
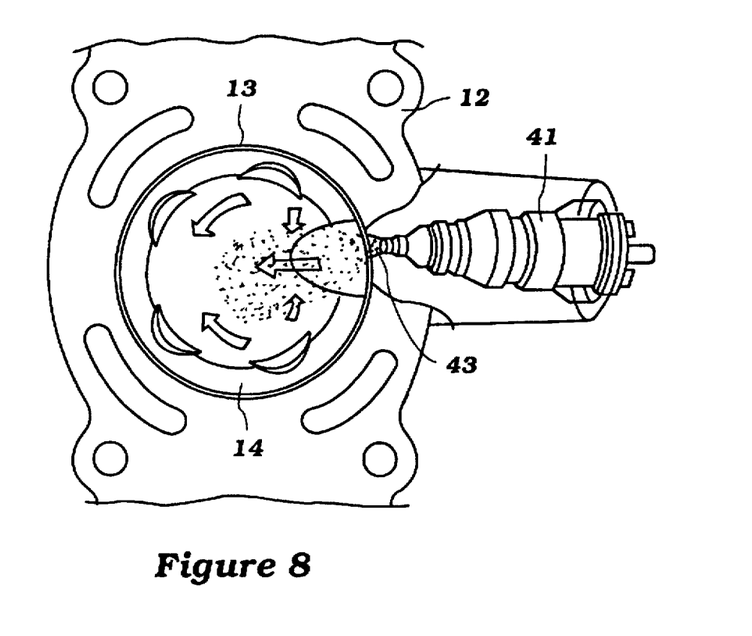
FIG. 8 is a top plan view of the engine of FIG. 7 with the cylinder head removed.

FIGS. 7 and 8 illustrate a further embodiment of the engine in which the fuel injector 41 is disposed at an acute angle from horizontal along the intake side of the cylinder block 12, with the nozzle 43 disposed immediately below the center intake valve seat 24. The injection recess 48 is disposed on the intake side of the piston head 44 underneath the center intake passage 23. In this position the injection recess 48 also serves as the clearance recess for the center intake valve 25. Thus, only five recesses are formed on the piston head 44. This results in a piston 14 that is more able to withstand the combustion forces within the bore 13.

The above direct injection configuration also produces a stratified charge with a homogenous mixture in the vicinity of the spark plug gap 21. The fuel spray is injected towards the gap 21 and mixes with the air flow from the center intake passage 23, while the air flow from the squish areas 22 and remaining intake passages 23 tends to flow about and behind the fuel prior to the firing of the spark plug 20. After the homogenous mixture at the gap 21 is ignited by the spark plug 20, it expands and forces unburnt fuel outwards in the manner previously described and thus induces combustion throughout the combustion chamber 19. Additionally, no squish-type flow is generated in the vicinity of the fuel injector nozzle 43 since the cooperation between the injector recess 48 and the center intake valve 25 does not tend to generate such flow. Thus, the fuel is injected towards the gap 21 in a stratified condition.

Figure 9:
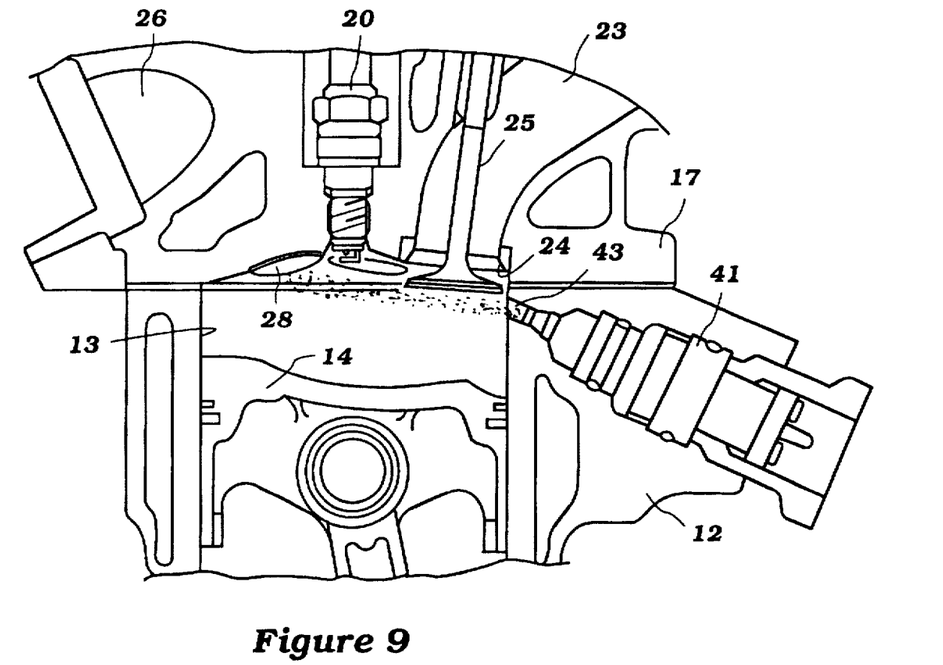
FIG. 9 is a cross-sectional view of a portion of an internal combustion engine similar to FIG. 7 and illustrates yet another embodiment of the invention.
Figure 10:
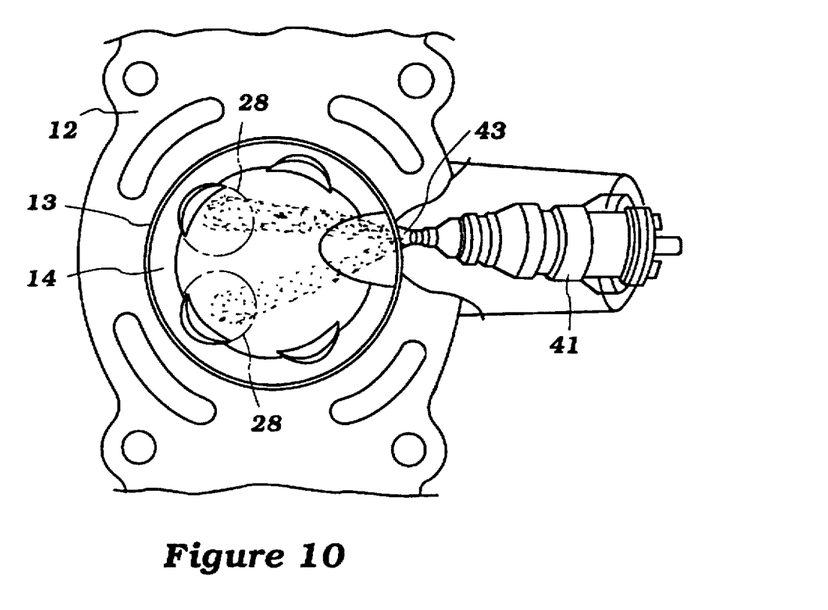
FIG. 10 is a top plan view of the engine of FIG. 9, with the cylinder head removed.

FIGS. 9 and 10 illustrate an embodiment of the invention that is similar to the embodiment of FIGS. 7 and 8. In this embodiment, however, the fuel injector 41 sprays the fuel in two separate jets towards each of the exhaust valves 28. This produces a stratified charge with a homogenous mixture in the vicinity of the spark plug gap 21 which, when ignited by the spark plug 20, burns and expands and causes the unburnt fuel to mix with the air charge and ignite in the manner previously described. Also, injecting the fuel towards the exhaust valves 28 causes the fuel to to travel around and beneath the center intake valve 25 which reduces any interference with the fuel injection by the valve 25 and also reduces the amount of fuel that impinges against the center intake valve head 29 and seat area 24.

Figure 11:
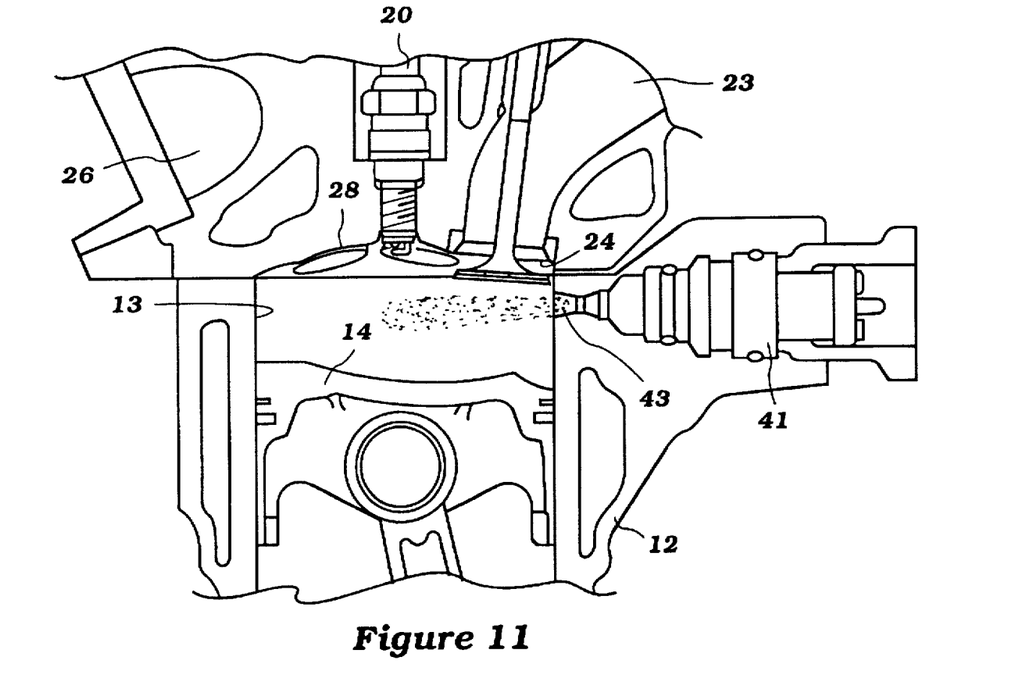
FIG. 11 is a cross-sectional view of a portion of an internal combustion engine similar to FIG. 9 and illustrates a further embodiment of the invention.
Figure 12:
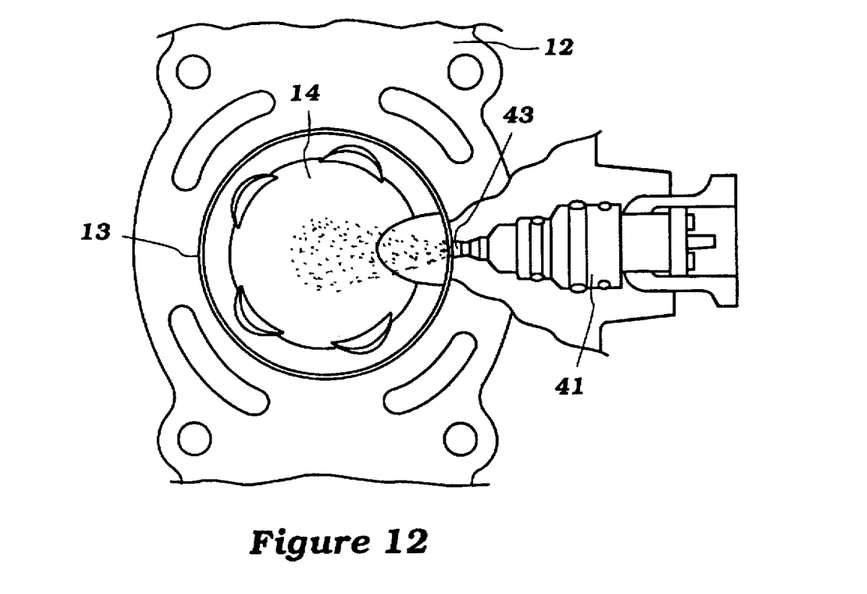
FIG. 12 is a top plan view of the engine of FIG. 11, with the cylinder head removed.

FIGS. 11 and 12 illustrate another embodiment of the invention that is similar to the embodiment of FIGS. 9 and 10, but further reduces the interference between the center intake valve 25 with the fuel injection by disposing the fuel injector 41 horizontally within the engine block 12. Thus, the fuel is injected transversely across the combustion chamber 19 underneath the intake valve seat 24. This still results in a stratified charge with a homogenous mixture near the spark plug gap 21, and the performance benefits of direct fuel injection are retained with this configuration.

It should be readily apparent to those skilled in the art that the above described direct fuel injection systems provide for superior charge stratification while avoiding the packaging constraints traditionally associated with such injection systems. Of course, the foregoing description is that of preferred embodiments of the invention, and various changes and modifications may be made without departing from the spirit and scope of the invention, as defined by the appended claims.

What is claimed is:

1. A direct injected internal combustion engine having a cylinder block defining at least one cylinder bore, a cylinder head closing one end of said cylinder bore, a piston reciprocating in said cylinder bore and forming with said cylinder bore and said cylinder head a combustion chamber, a plurality of valve seats formed in said cylinder head comprising at least one intake valve seat for providing an intake flow path into said combustion chamber for an air charge and an at least one exhaust valve seat for providing an exhaust flow path from said combustion chamber to the atmosphere, a plurality of poppet valves supported in said cylinder head and having head portions cooperating with said intake and exhaust valve seats for controlling the flow therethrough, there being at least two of one of the intake and exhaust valve seats, at least one fuel injector mounted in said cylinder block for spraying fuel into said combustion chamber through said cylinder bore, and a spark plug mounted in said cylinder head with its gap being disposed centrally of said combustion chamber for firing the charge formed by said fuel injector.

2. A direct injected internal combustion engine as set forth in claim 1, wherein the fuel injector is mounted in the cylinder block at the end of the cylinder bore closed by the cylinder head.

3. A direct injected internal combustion engine as set forth in claim 2, wherein the fuel injector is positioned so that it is disposed below the top of the head of the piston when the piston is at its top dead center position.

4. A direct injected internal combustion engine as set forth in claim 1, wherein the fuel injector is disposed so that its spray axis extends transversely across the cylinder bore.

5. A direct injected internal combustion engine as set forth in claim 4, wherein the fuel injector injects at least a portion of its fuel toward the cylinder head.

6. A direct injected internal combustion engine as set forth in claim 5, wherein the intake valve and exhaust valve seats are disposed on opposite sides of the cylinder head.

7. A direct injected internal combustion engine as set forth in claim 6, wherein the fuel injector is disposed between the valve seats at one side of the cylinder block.

8. A direct injected internal combustion engine as set forth in claim 7, wherein the fuel injector is mounted in the cylinder block at the end of the cylinder bore closed by the cylinder head.

9. A direct injected internal combustion engine as set forth in claim 8, wherein the fuel injector is positioned so that it is disposed below the top of the head of the piston when the piston is at its top dead center position.

10. A direct injected internal combustion engine as set forth in claim 9, wherein the piston head is formed with a recess to clear the path of fuel injected by the fuel injector so as to not obstruct the flow even when the piston is at its top dead center position.

11. A direct injected internal combustion engine having a cylinder block defining at least one cylinder bore, a cylinder head closing one end of said cylinder bore, a piston reciprocating in said cylinder bore and forming with said cylinder bore and said cylinder head a combustion chamber, a plurality of valve seats formed in said cylinder head for providing an intake flow path into said combustion chamber for an air charge and an exhaust flow path from said combustion chamber to the atmosphere, a plurality of poppet valves supported in said cylinder head and having head portions cooperating with said valve seats for controlling the flow therethrough, at least one fuel injector mounted in said cylinder block at the end of the cylinder bore closed by said cylinder head for spraying fuel into said combustion chamber through said cylinder bore, said fuel injector being positioned so that it is disposed below the top of the head of said piston when said piston is at its top dead center position, said piston head being formed with a recess to clear the path of fuel injected by said fuel injector so as to not obstruct the flow even when said piston is at its top dead center position, and a spark plug mounted in said cylinder head with its gap being disposed centrally of said combustion chamber for firing the charge formed by said fuel injector.

12. A direct injected internal combustion engine having a cylinder block defining at least one cylinder bore, a cylinder head closing one end of said cylinder bore, a piston reciprocating in said cylinder bore and forming with said cylinder bore and said cylinder head a combustion chamber, a plurality of valve seats formed in said cylinder head comprising at least one intake valve seat for providing an intake flow path into said combustion chamber for an air charge and an at least one exhaust valve seat for providing an exhaust flow path from said combustion chamber to the atmosphere, a plurality of poppet valves supported in said cylinder head and having head portions cooperating with said intake and exhaust valve seats for controlling the flow therethrough, there being at least two of one of the intake and exhaust valve seats, said intake valve and exhaust valve seats being disposed on opposite sides of said cylinder head, a third valve seat between a pair of the valve seats, and at least one fuel injector mounted in said cylinder block between the valve seats at one side of said cylinder block for spraying fuel into said combustion chamber transversely across said cylinder bore and at least a portion of its fuel being directed toward said cylinder head.

13. A direct injected internal combustion engine as set forth in claim 12, wherein the fuel injector is mounted in the cylinder block at a position between the pair of valve seats and contiguous to the third valve seat.

14. A direct injected internal combustion engine as set forth in claim 13, wherein the fuel injector is mounted in the cylinder block at the end of the cylinder bore closed by the cylinder head.

15. A direct injected internal combustion engine as set forth in claim 14, wherein the fuel injector is positioned so that it is disposed below the top of the head of the piston when the piston is at its top dead center position.

16. A direct injected internal combustion engine as set forth in claim 15, wherein the piston head is formed with a recess to clear the path of fuel injected by the fuel injector so as to not obstruct the flow even when the piston is at its top dead center position.

17. A direct injected internal combustion engine as set forth in claim 16, wherein the head of the piston is provided with a plurality of recess for clearing the heads of the poppet valve.

18. A direct injected internal combustion engine as set forth in claim 17, wherein there are only valve clearing recesses for the pair of valves on the side of the piston where the fuel injector is disposed and wherein the recess for clearing the fuel injector is also large enough to clear the head of the center valve.

19. A direct injected internal combustion engine as set forth in claim 12, wherein the spray from the fuel injector is toward the third valve.

20. A direct injected internal combustion engine as set forth in claim 13, wherein the fuel injector is disposed so that its spray axis extends transversely across the cylinder bore.

* * * * *